July 2, 1957 W. F. ENCHELMAIER ET AL 2,797,966
APPARATUS FOR MAKING BRUSHES
Filed Jan. 11, 1955 6 Sheets-Sheet 4
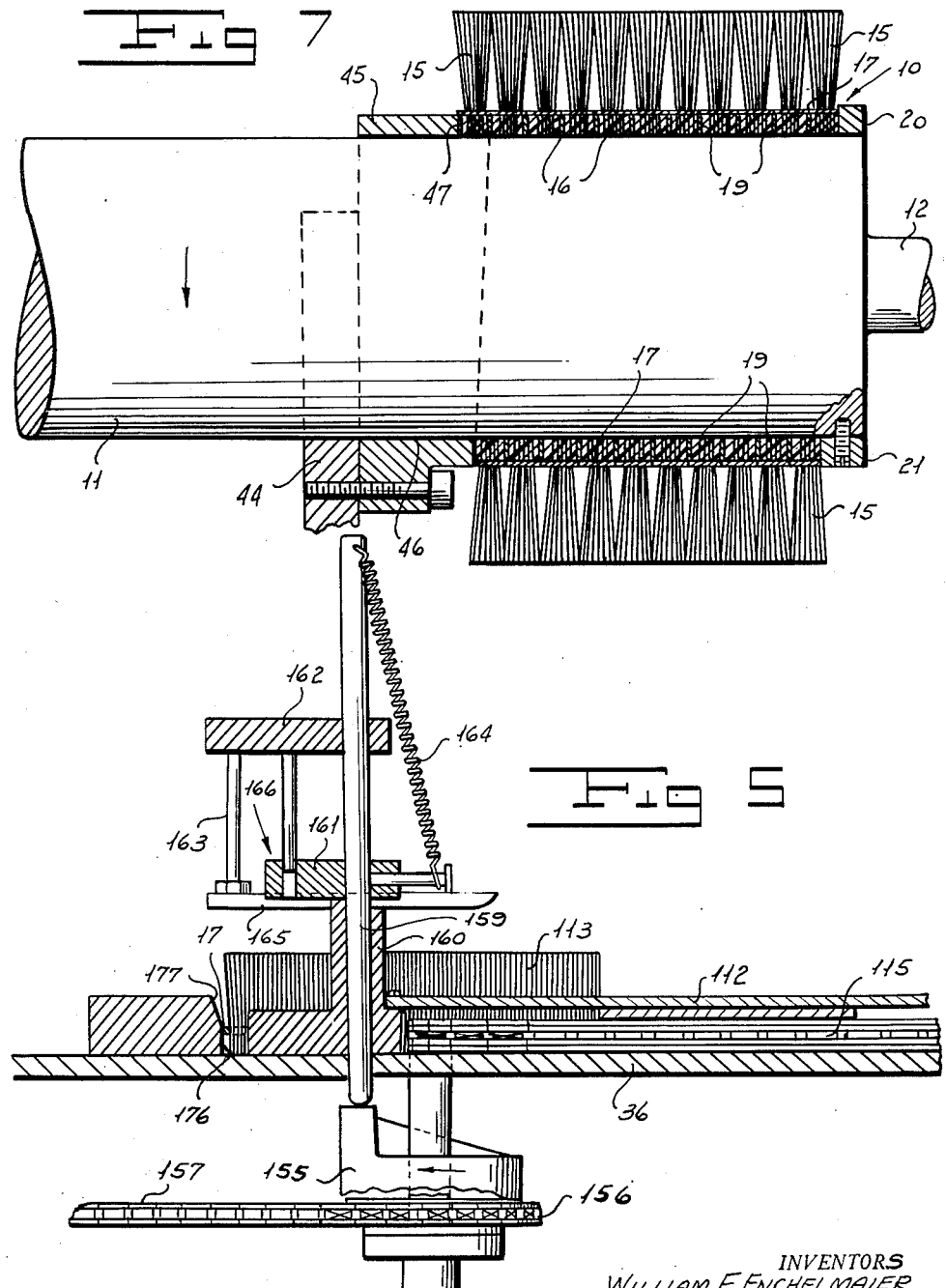
INVENTORS
WILLIAM F. ENCHELMAIER
HARVARD W. K. ENCHELMAIER
BY
Alfred W. Vibber
ATTORNEY

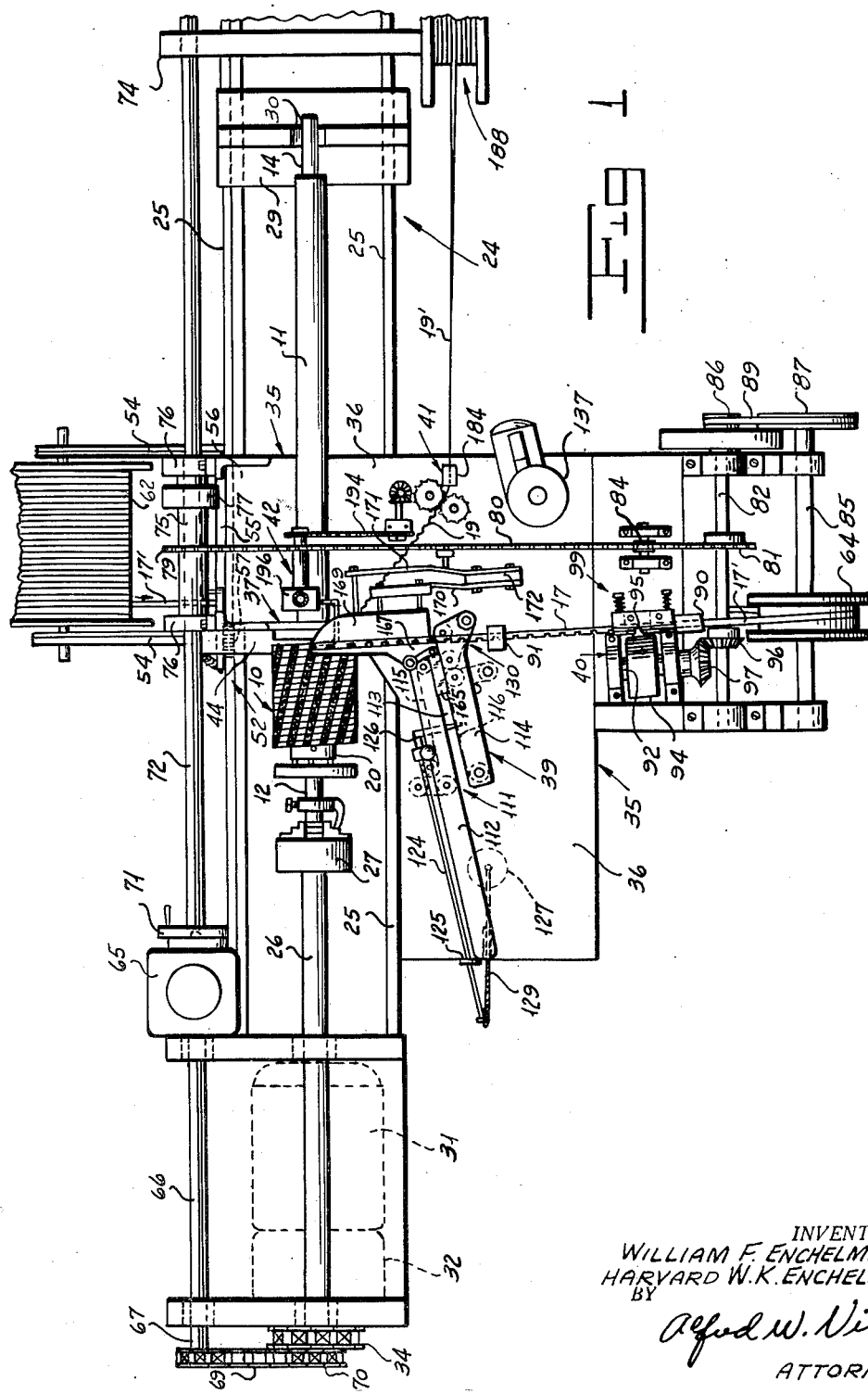

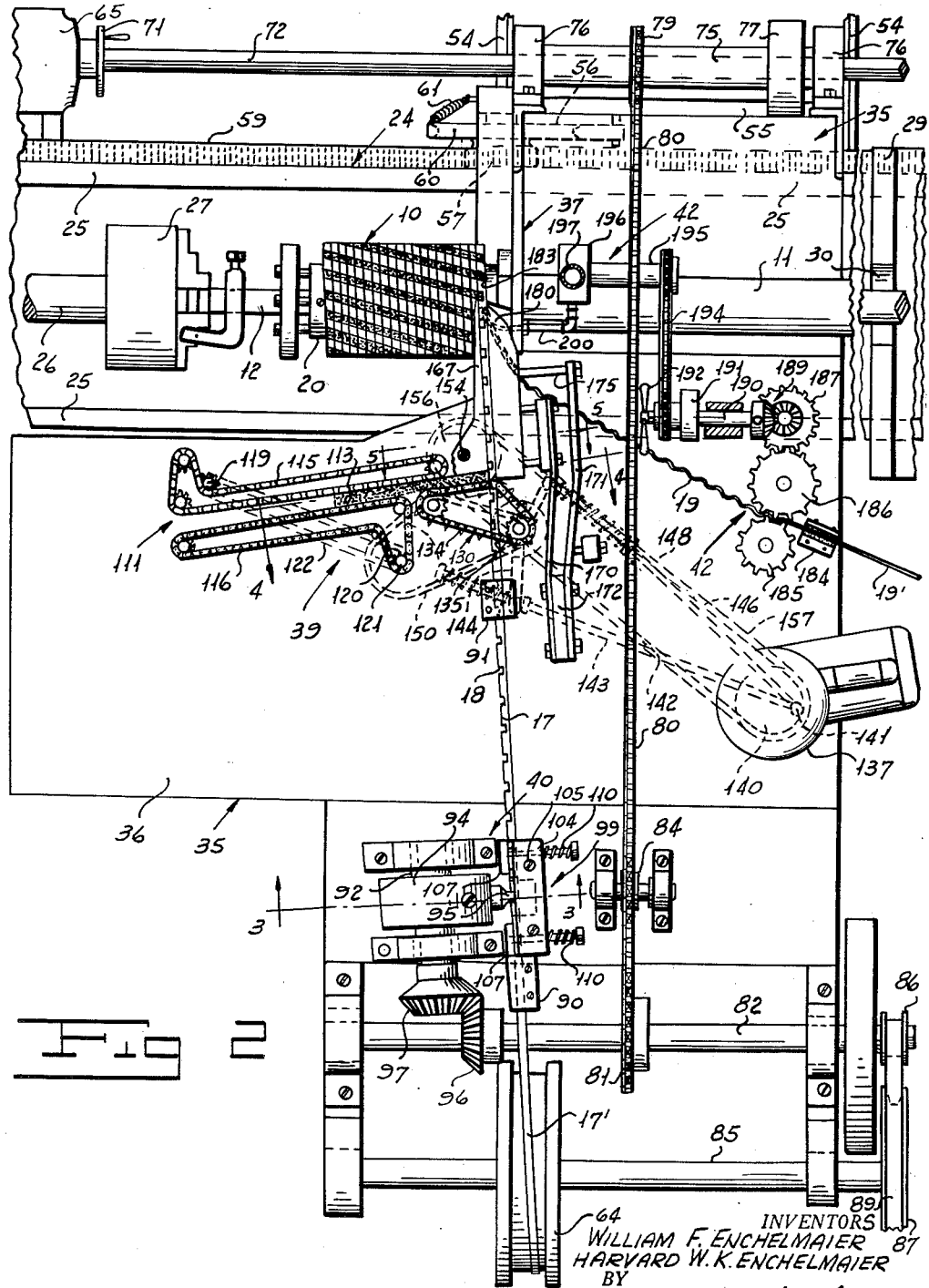

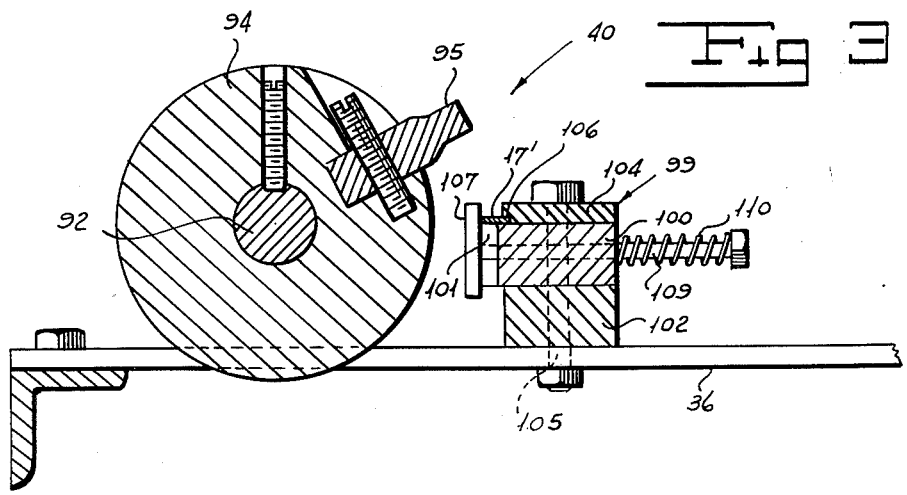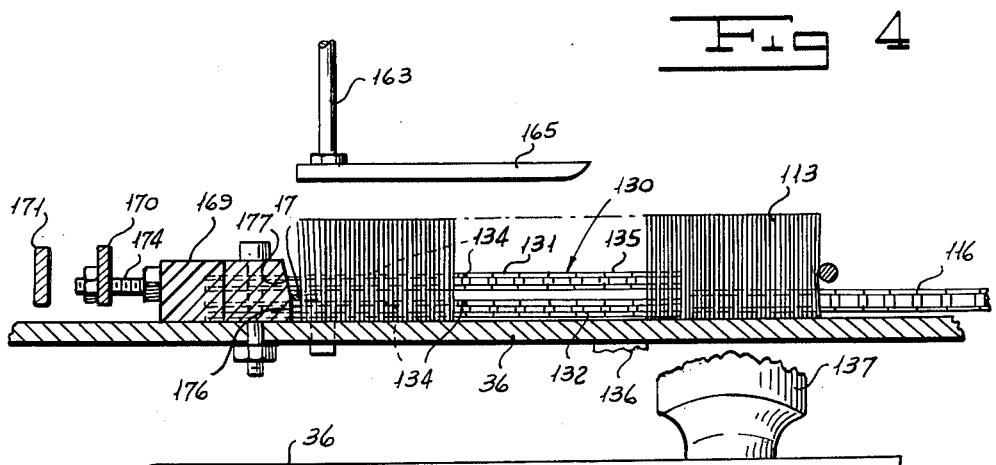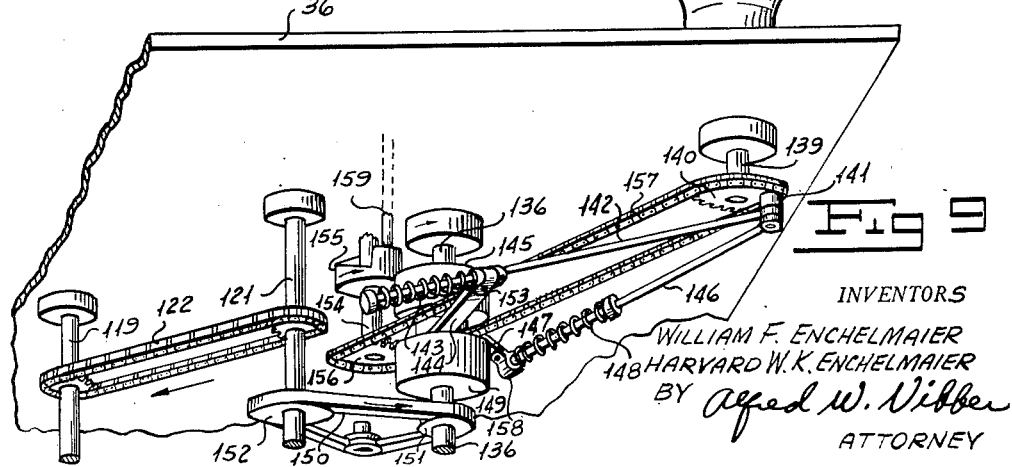

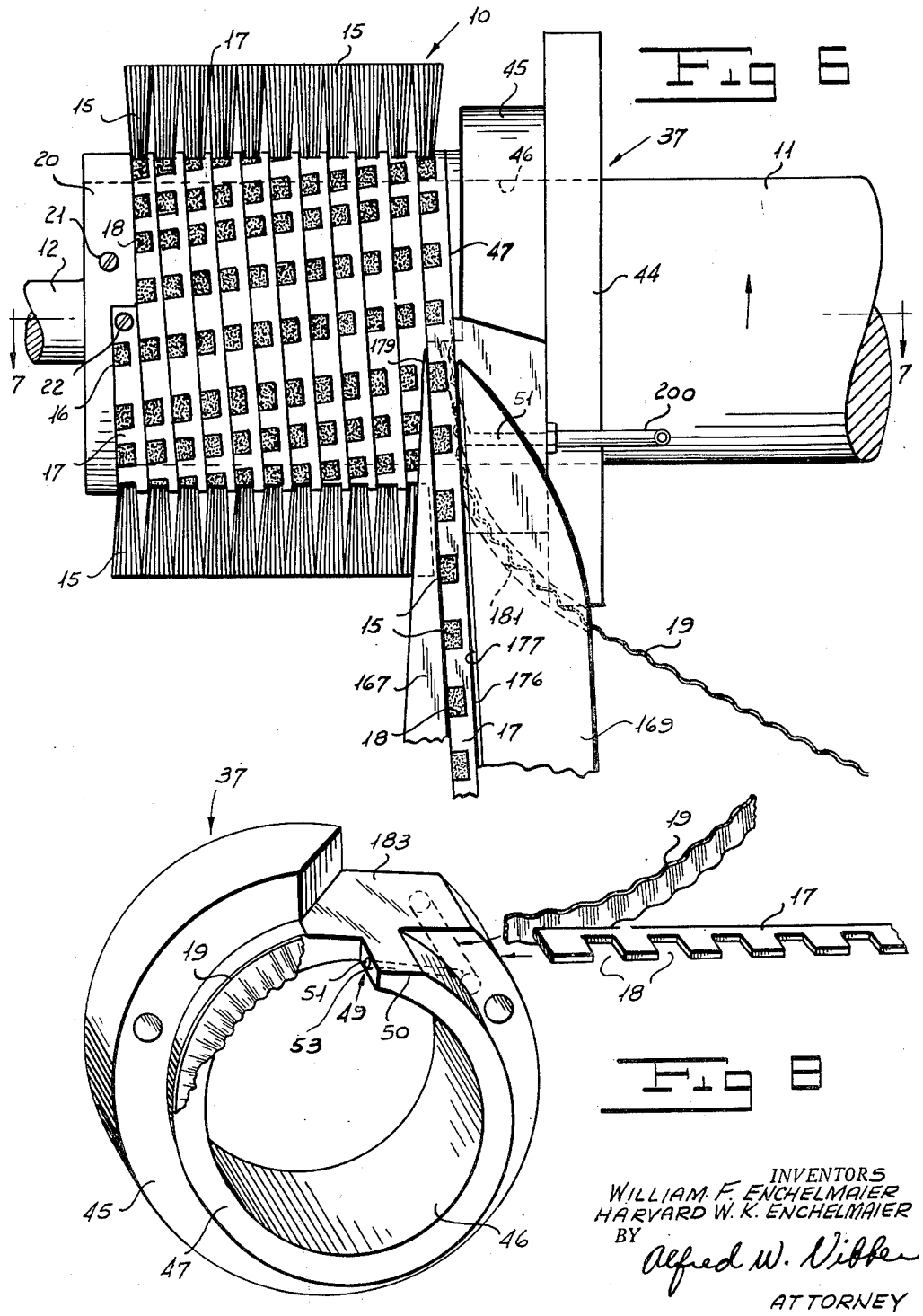

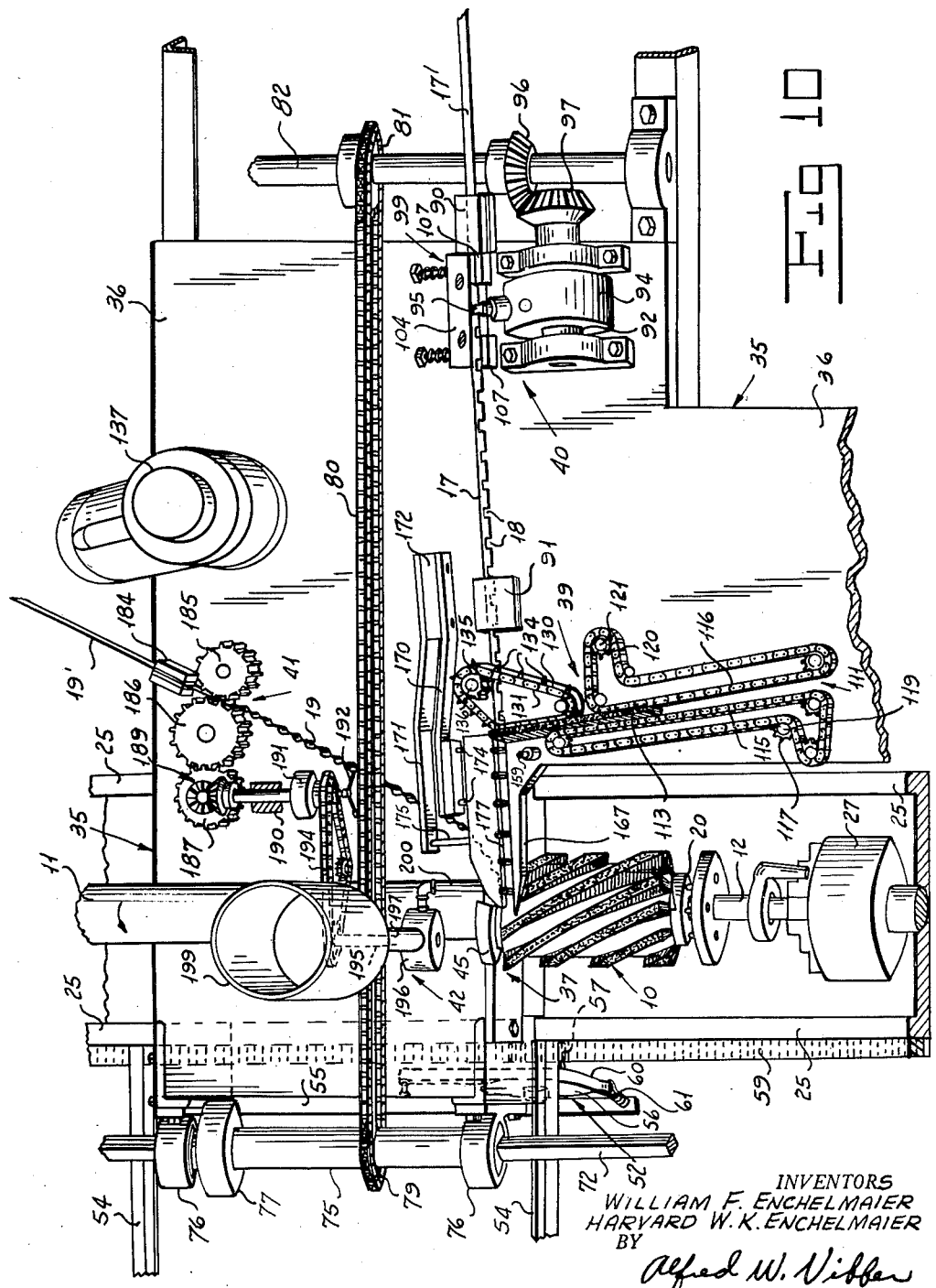

– – –

United States Patent Office 2,797,966
Patented July 2, 1957

2,797,966
APPARATUS FOR MAKING BRUSHES

William F. Enchelmaier, Great Notch, and Harvard W. K. Enchelmaier, Cedar Grove, N. J.

Application January 11, 1955, Serial No. 481,131

24 Claims. (Cl. 300—2)

This invention relates to apparatus for forming cored cylindrical brushes. More particularly, the invention relates to a machine for forming cored cylindrical brushes wherein tufts of bristles are located and at least partially retained on the core in a predetermined spaced relationship by a notched strip or wire helically wound on the brush core.

Brushes of the above indicated type, which may be of considerable length and diameter, are used in industry in a variety of applications, such as the brushing of woven cloth to raise the nap. For such typical use it is desirable that the brush shall be as uniform as possible in order to treat the cloth uniformly over its entire area. It is accordingly highly desirable, not only for the sake of appearance of the brush, but also because of its effect on the product being brushed, that the rows of tufts on the brush core shall be as uniformly and regularly spaced as possible.

Prior brushes of the above indicated type have been made with notched wires or strips in which the notches were formed independently of the formation of the brush and remote from the brush making machine. Thus, for a brush having a core of a given diameter and which is to have bristle tufts of a predetermined size located in rows spaced angularly about the core, the strip or wire has been notched on a separate machine, the spacing between successive notches being calculated for each diameter of core, allowing for the radial height of the second, radially extending wire, which serves as an additional bristle retaining means and as the immediate support for the notched wire. This procedure requires the provision of a separate source of supply for each brush in which the spacing between successive tufts helically of the core is different. Usually in such procedure the notched wire is pulled onto the core by the rotation of the core itself, the notched wire in its travel picking up tufts of bristles. The second, radially extending wire, upon which the unnotched edge of the first wire rests, is likewise pulled onto the core and wound thereon by the rotation of the core itself.

Whenever the ratio of the angular speed of rotation of the core to the speed of longitudinal travel of the notched wire varies, as by variation in core diameter or variation in the radial height of the second wire, or both, the predetermined desired spaced relationship between the successive tufts in each row on the brush is disturbed. Thus, for example, if the rows of tufts on the core were initially started parallel to the axis of the brush core and to each other, significant variations in any of the above factors would cause the rows to twist into a helix in either one direction or the other. If the rows of tufts on the core were originally started as helical, variation of any such factor would change the angle of the helix. Such variation in the alignments of the rows of tufts is, as noted, unsightly, and also produces a brush of inferior, non-uniform, working qualities.

It is among the objects of the present invention to provide a machine for forming cored cylindrical brushes wherein a bristle locating and retaining wire is progressively deformed as such wire is wound on the brush core.

A further object of the invention resides in the provision of a machine of the above indicated character wherein spaced notches are formed in an edge of the outer bristle tuft forming and holding wire as such wire is wound on the brush core. Yet another object of the invention resides in the provision of such brush forming machine wherein the spacing between successive notches on such wire is governed by the rate of rotation of the brush core about its axis, in a preferred embodiment of the machine the relationship between the spacing of successive notches and the rate of rotation of the core being variable at will.

Still a further object of the invention, in a preferred embodiment thereof, resides in the provision, in a machine for forming cored cylindrical brushes wherein the bristle tufts are located and at least partially retained by a deformed wire, of wire deforming means incorporated as a part of the brush forming machine and driven by the travel of the wire therepast as the wire is wound on the core.

Additional objects of the invention reside in the provision, in a machine of the type indicated in the immediately preceding sentence, of a bristle-retaining-adhesive feeding means which is driven in timed relationship with the wire deforming means, and in a preferred embodiment of the invention is driven from the wire deforming means, so that the delivery of the correct amount of adhesive into the progressively formed bristle root containing pocket on the brush core is insured, and the provision of improved mechanism for feeding the bristles into contact with the bristle retaining wire prior to winding of the wire onto the core.

The above and further objects of the invention, including economies of manufacture and use of the brush forming machine, will be more readily apparent upon consideration of the following description of a preferred embodiment thereof.

Our invention is clearly defined in the appended claims. In the claim, as well as in the description, parts are at times identified by specific names for clarity and convenience, but such nomenclature is to be understood as having the broadest meaning consistent with the context and with the concept of our invention as distinguished from the pertinent prior art. The best form in which we have contemplated applying our invention is illustrated in the accompanying drawings forming part of this specification, in which:

Fig. 1 is a fragmentary view in plan of a preferred embodiment of the brush forming machine of the invention, a part of the machine at the right-hand end and a portion of the strip or strand supplying reel at the rear of the machine being broken away.

Fig. 2 is a fragmentary view in plan in its central, bristle-feeding-and-applying portion, the channel-forming cover plates over the preliminary bristle feeding chains being removed, a part of the machine at the drive shaft bearing for the adhesive delivery pump being shown in horizontal section.

Fig. 3 is a view in vertical section through the machine at the strip notching device, the section being taken along the line 3—3 of Fig. 2.

Fig. 4 is a view in vertical section through the machine at the location of the means for presenting bristles to the notched edge of the bristle retaining strip or strand, the section being taken along the line 4—4 of Fig. 2.

Fig. 5 is a view in vertical section through the machine at the location of the bristle tamping end and aligning means, the section being taken along the line 5—5 of Fig. 2.

Fig. 6 is an enlarged fragmentary view in plan of a partially formed brush and of the sleeve or bushing portion of the machine for applying to the brush core the first notched strand, the second crimped strand, and the bristle tufts engaged in the notches of the first strand, the rows of bristles of the partially formed brush facing the reader being removed except for the roots thereof.

Fig. 7 is a fragmentary view in axial diametral section through the brush being formed and through the sleeve or bushing of the machine cooperating therewith, the core of the brush being shown in elevation, the section being taken along the line 7—7 of Fig. 6.

Fig. 8 is a fragmentary schematic view of the sleeve or bushing of the machine and of the two bristle retaining strips or strands approaching it.

Fig. 9 is a fragmentary view in perspective of a portion of the machine beneath the platform of the carriage depicting the driving means for the bristle feeding chains and for the bristle tamping and aligning means.

Fig. 10 is a fragmentary view in plan of the brush forming machine, particularly showing the bristle retaining adhesive supplying and feeding system and the driving means for the pump thereof.

The construction of a typical brush made by the apparatus of the invention will be apparent from a consideration of a portion of the brush being formed by the machine in Figs. 1, 2, 6, 7, and 10 and designated generally by the character 10. Such brush has a circular cylindrical core 11 having a reduced diameter left-hand end 12 (Figs. 1, 2, 6, and 10) and a similar reduced diameter right-hand end 14 (Fig. 1). In such brush a plurality of bristle tufts 15 are arranged in a plurality of parallel, equally spaced rows arranged helically on the core. In the drawings, for the sake of simplicity, such rows are depicted as straight lines. The bristle tufts 15 have roots 16 (Figs. 6 and 7) which abut the outer surface of the core and which were initially located on the brush core by reason of the reception of each in its particular notch 18 in the left-hand edge (Figs. 1, 6, etc.) of the first flat strand 17. As particularly well shown in Fig. 7 the first strand 17, the broad surface of which lies parallel to the outer surface of the core 11, overlies the radially extending edge-wound second strand 19 on the core. The strand 17 adjacent turns of strand 19 and the outer surface of the core 11 of the brush form a laterally and radially outwardly closed space into which is flowed bristle-retaining adhesive under pressure so as to bond the bristle tufts to the core and to each other. The left-hand end of the brush core, at which the bristle assembly is started, is provided with a collar 20 held thereon by the set screw 21, and the brush confronting face of the collar being of helical configuration and having a clamping means 22 at the step thereof, as shown in Fig. 6, whereby the leading ends of the strands 17 and 19 may be secured to the collar. A similar collar (not shown) is employed at the end of the brush core last to be wound (the right-hand end in Fig. 1) whereby to retain the trailing ends of the strands 17 and 19.

It will be apparent from the above that when strand 17 is pre-notched with a given spacing between successive notches calculated from the diameter of the core 11 plus the diameter added thereto by the edge-wound strand 19 upon which strand 17 lies, any material variation in the effective diameter of the article (core 11 with the edge-wound strand 19 thereon) upon which strand 17 is wound will result in the progressive displacement of successive tufts in a given row from the desired path of such row. The apparatus of the present invention, by providing means at the machine itself for notching the edge of strand 17 immediately in advance of the winding of such strand on the brush core, the provision of means for driving the strip notching means in timed relation to the rotation of the core and, in the embodiment shown, the provision of means allowing the variation of such relationship in infinite increments, allows an operator readily to change the spacing of the notches in the strip as required to hold the tufts in a row along substantially the desired path. Further, the apparatus of the invention allows brushes to be formed in which the configuration of the rows of bristles may at any time be changed appreciably. Thus, for example, while the machine is operating continuously the spacing of the notches of strip 17 may be changed so that the bristle tufts lie in curved rows, or they may be given a herringbone shape by operating the machine in such manner as abrutly to change the direction of the rows of bristle tufts on the core.

The machine of the invention has an elongated main bed 24 similar to the bed of a lathe. Bed 24 is provided with the parallel longitudinal ways 25, with the driven arbor 26 at the head of the machine through which the core 11 of the brush is supported and rotated, in the direction indicated by the arrows, by the chuck 27 mounted thereon. A support 29 is provided at the right or outboard end of the core (Fig. 1), the reduced end of the core being received in the V central notch 30 in support 29. Core 11 of the brush is rotated by means of an electric motor 31 driving through a speed reducer generally shown at 32, and from the speed reducer to the arbor 26 by means of the drive chain 34.

The machine is provided with a carriage or movable support 35 slidable longitudinally of the bed 24 on the ways 25. The carriage is built up of a framework, as shown, and has an upper platform 36 formed of a heavy steel plate. Positioned on platform 35 and movable therewith longitudinally of the machine bed are the means 37 for applying bristles, strands, and adhesive to the brush core, the bristle feeding means generally designated 39, the means 40 for notching the bristle confronting edge of the first strip 17, the means 41 for crimping the second wire 19 transversely to its length, and the means 42 for feeding bristle-retaining adhesive to the pocket formed on the core and enclosing the roots of the bristle tufts.

*The means for applying the bristles and strands to the core*

This means, generally designated 37, is best shown in Figs. 6, 7, and 8. Such means includes the sleevelike block 45 bolted to the left-hand surface of the vertical plate 44, which is a part of carriage 35, in a position coaxial of the core 11 as it is held by the chuck 27 and the outboard support 29. The bore 46 through the member 45 is of such diameter as fairly accurately to receive the core 11. The left-hand face (Fig. 6) of the smaller diametered portion of member 45 has a helical surface 47 which rises toward the reader from a low zone slightly to the right of vertical at the top in a counterclockwise direction until it reaches the abrupt step 49. The step of the helix, for reasons more apparent hereinafter, has a width closely approximating the width of the first strand 17. Step 49 has a flat horizontal upper surface 50, the left-hand edge 53 of which (Fig. 8) is vertical and relatively thin. The portion of member 45 immediately below the flat surface 50 thereon has an adhesive conducting passage 51 which extends therethrough, the forward end of the passage emerging through the edge 53. The larger diametered end of member 45 has a cut-out portion having a flat horizontal surface 183 slidingly supporting the rear end of the guide 169 (to be described) for leading strand 17 to the member 45.

At the moment, it will suffice to describe member 45 as serving as a guide for the notched strand 17 and the bristle tufts (not shown in Fig. 8) contained in the notches thereof and also as a guide for the crimped wire 19 as the wires or strands are wound onto the brush core 11 as the latter rotates counterclockwise in member 45 (as it is shown in Fig. 8) to produce the brush structure shown in Fig. 7. As apparent in Fig. 8 the crimped wire 19 is fed along the top of member 45 so that it travels tangent to the low zone of the helical surface 47, and the notched strip 17 with its contained bristle tufts is fed in the direction of the arrow inwardly to the core along the guide surface 50 so that the smooth unnotched edge of the strip overlies the outer edge of crimped wire 19. The guiding means 165, 167 for the notched strand 17 and the bristle tufts entrained in the notches therein, and the crimping means 41 for strand 19 together with the adhesive feeding means driven by the crimping means, all to be described hereinafter, impose substantial tensions on the two strands as they are wound on the core. By reason of the progressive feeding of the strands 17 and 19, and of the bristle tufts, between the helical surface 47 and the last complete helical turn of wires and bristle tufts laid down on the core, the member 45, and thus the carriage 35 to which it is attached, are progressively forced to the right (Fig. 1).

To insure that such successive turns of wires and bristle tufts are adequately compacted on the brush core longitudinally of the latter, with successive turns of strand 17 lying in edge-contacting relationship, there is provided a carriage retarding brake generally designated 52 which imposes a desired variable braking of the travel of carriage 35 to the right. Device 52 is mounted on the vertical plate 55 which depends from the two parallel rearwardly projecting channel members 54 on carriage 35. A shaft journalled on plate 55 carries a brake drum 56 and a pinion 57, such pinion meshing with the gear rack 59 extending along the machine bed below the rear way thereof. A brake strap 60 is held in contact with the brake drum 56 by means of the adjustably tensioned spring 61. After a brush has been fully wound, the carriage braking means 52 may be temporarily disabled so that the carriage may be returned to its starting, left-hand position by hand.

The two channel members 54 also function as the means for supporting the arbor of a supply coil 62 of the unnotched first strand 17'. Such unnotched strand 17' extends from coil 62 beneath the carriage 35 on the bed 34 of the machine and emerges upwardly over the rubber surfaced driven frictional feeding drum 64 at the front of the machine. From drum 64 strand 17' is fed to the edge notching means 40 to be described hereinafter.

The bristle feeding means 39 and the edge notching means 40 of the machine are driven in timed but selectively variable relation to the rotation of the arbor 26 by means of the variable speed changer 65 which may be of the P. I. V. type. Speed changer 65 has its input shaft 66 connected to the output shaft of the speed reducer 32 by means of the sprockets 67 and 70 on such shafts and the chain 69 which connects them. Speed changer 65, the delivered speed of which may be adjusted by the control disc 71, drives the squared shaft 72 which extends longitudinally of the machine bed and the right-hand supporting member 74 of the bed. Projecting rearwardly from the carriage 35 are the aligned bearings 76 which rotatably mount between them the sleeve member 75. The sleeve 75 has a central squared passage therethrough which slidably and non-rotatably receives the squared shaft 72. Thus, at all times, regardless of the longitudinal position of the carriage 35, the sleeve 75 is driven at the speed dictated by the control 71 of speed changer 65. A fly-wheel 77 is provided on the sleeve 75 so as to smooth out any small vibrational variation in speed of rotation of sleeve 75.

A sprocket 79 on sleeve 75 is drivingly connected to a sprocket 81 on a driven shaft 82 forwardly of the carriage by means of the chain 80, the top run of which extends over the idler sprocket 84. The previously described strand feeding drum 64 is mounted on a further front shaft 85 which is driven between belt 89 entrained over pulleys 86 and 87 on shafts 82 and 85, respectively. The unnotched strand 17' is, therefore, urged toward the strand notching means in timed relation with the rotation of arbor 26 and thus of the core 11 of the brush. The edge notching means 40 now to be described is also driven in timed relationship with arbor 26.

The strand edge-notching means

After leaving the feeding drum 64 the unnotched strand 17' enters a first guiding means 90 which confines it from travel vertically and accurately aligns it horizontally in such a path so that its right-hand edge (Fig. 1) is tangent to the low zone on the helical face 47 of the bristle and strand applying member 45. A further guide 91 positioned rearwardly of the notching means 40 cooperates with the notched strand 17 to maintain it in such path.

The structure of the edge-notching means 40 is most clearly shown in Figs. 2, 3, and 10. As there shown, a short shaft 92 is journalled horizontally in bearings mounted on platform 36 of the carriage in a direction parallel with the direction of feeding of the first strand (17', 17). Shaft 92 carries an enlarged head 94 affixed thereto, such head bearing a radially extending shearing tool 95 having an outer end of the width of the notches desired. Shaft 92 and thus head 94 are driven from the shaft 82 by means of the intermeshed bevel gears 96 and 97.

Edge-notching means 40 has a stationary anvil generally designated 99, the anvil being made up of a stationary die block 100 having a central vertical notch 101 therein to receive the movable cutting tool 95 as it rotates therepast. Die block 100 is held in the correct vertical position by the spacer block 102. A top plate 104 having a downwardly facing rabbet 106 forms with the upper edge of the die block a guiding groove accurately receiving the right-hand edge of the first strand. Bolts 105 extending through the top plate, the die block, and the spacer block retain them in position on the platform 36. The first strand is accurately held in such guide in anvil 99 by the two channel pressure pads 107, positioned one on each side of the shear 95. Each pressure pad is formed as the enlarged head of a T-shaped member having a stem 109, the stem and thus the pressure pad being constantly urged to the right (Figs. 2 and 3) by the coil compression spring 110 acting between the enlarged rear end of the stem and the die block 100.

It will be apparent that the width of the notches cut by the cooperating die members 95 and 100 remains constant. The spacing between successive notches, however, may be varied at will during operation of the machine by operating variable speed means 65 to vary the speed of rotation of shaft 72 relative to arbor 26. By appropriate control of means 65, therefore, the operator can readily act to correct a tendency of the machine to lay down the bristle tufts in rows which deviate from their desired alignment. Thus, if he observes that the helical angle of the rows of bristle tufts is constantly decreasing in an undesired manner, he has only to adjust means 65 to increase slightly the spacing between successive notches to bring subsequently laid down bristle tufts into correct alignment. Adjustment of means 65 in the opposite direction is made if the bristle tuft row helix increases in angle undesirably.

The preliminary bristle feeding means

On top of the platform 36 of the carriage at the left-hand forward portion thereof (Fig. 1) there is provided bristle feeding mechanism presenting a preliminary bristle receiving channel 111. The channel is formed by a first, rear guide, raised somewhat above the level of the platform 36 by spacer members generally indicated, and by a second similarly raised forward guide member 114. Untufted, loosely packed bristles 113 are introduced by hand in vertically upstanding position into the channel 111 with their lower ends resting upon the platform 36. Beneath each of the guide members 111 and 114 and between such member and the platform 36 are the driven bristle feeding chains 115 and 116, respectively, the confronting inner runs of the chains running at the same speed in the direction into the channel and being so positioned as slightly to protrude into the channel to grip the bristle roots therebetween. The manner in which chains 115 and 116 are driven will be clear from a consideration of Figs. 2 and 9. Chain 115 is driven by the sprocket 117 on the upper end of shaft 119 which extends upwardly through the platform 36. The driving sprocket 120 for chain 116 is mounted on the upper end of the vertical shaft 121 extending upwardly through platform 136. The shafts 119 and 121 are drivingly connected to rotate at the same speed by the chain 122 entrained over sprockets on such shafts. Shafts 119 and 121 and thus bristle feeding chains 115 and 116 are driven by geared motor 137 through yielding intermittently acting driving means shown in Fig. 9 and to be described hereinafter.

Bundles of precut bristles are manually introduced into the channel 111 and are thrust to the right (Fig. 1) until they are grippingly engaged between the confronting runs of the feeding chains 115 and 116. To insure the correct feeding of the bristles 113 by the chains, there is provided an additional feeding means in the form of a selectively operative plunger which may be swung into engagement with the rear of the row of bristles in channel 113 in order to urge the bristles to the right. Such means is made up of the plunger rod 124 loosely received in the guide 125, the plunger rod having a laterally directed head 126. The engagement between the rod 124 and guide 125 is such that the plunger may occupy the operative position, shown in Fig. 1, wherein the head 126 lies on the member 112 and is in engagement with the rear of the row of bristles 113, or may be swung counterclockwise about guide 125 into an inoperative position in which the head 126 is removed from contact with the row of bristles being fed, as when additional bristles are being introduced into the channel 111. The plunger 124 is urged to the right by means of the freely hanging weight 127 beneath the carriage 35, the weight being connected to the rear end of the plunger by means of the cord 129 extending through the carriage top and guided by a pulley as shown.

*The bristle tamping and end aligning means*

After the bristles have progressed to a point approaching the discharge end of the channel 111 and thus the confronting runs of the chains 115 and 116, their upper ends are subjected to the tamping action of the vertically reciprocable horizontal tamping shoe 165 so as to bring all the bristles, which are cut to equal lengths, into such position that their lower ends contact the top of platform 36.

Shoe 165 is operated by the mechanism most clearly shown in Figs. 1 and 5. Driven from the shaft 139 of the geared motor 137 is the vertical shaft 154. A driving connection between such shafts is afforded by the sprocket 140 on shaft 139, the sprocket 156 on the bottom of shaft 154, and the chain 157 connecting such sprockets. Shaft 154 carries thereon beneath platform 36 the helical ended face cam 155. A tappet rod 159, extending through the boss 160 on platform 36 rides on the helical face of cam 155 and thus is vertically reciprocated as the cam rotates. A coil tension spring 164 extending from the top of tappet rod 159 to a part 161 of the fixed frame of the carriage insures that the tappet rod follows the cam.

The shoe 165 is positioned laterally of the tappet rod and is connected thereto by means of the support 162 affixed to the rod and the laterally and downwardly extending arm 163 connecting the members. The shoe 165 and the tappet rod 159 are further guided for vertical travel by the guide means 166, consisting of a vertical rod reciprocating in an opening in the rear of member 161. The member 165 overlies, in its rearward portion, the bristles 113 as they are gripped between feeding chains 115 and 116, and in its forward portion overlies the bristles as they are transferred to the second bristle feeding means 130 which applies them to the notches of the strip 117.

*The second bristle feeding means*

As evident in Figs. 1, 2, 4, and 10, the run of bristle feeding chain 115 confronting the channel 111 is somewhat longer than that of chain 116 and partially overlaps the bristle feeding chains of the device 130 at such channel. As shown particularly in Fig. 4 device 130 includes an upper chain 131 and a lower chain 132, such chains being entrained around the upper and lower sprockets on the driven shaft 136 and around two idler double sprockets so that the chains have an obtuse triangular configuration in plan. The straight run of each of chains 131 and 132 confronting the channel 111 extends somewhat beyond the path of the notched strand 17, chain 131 lying above such strand and chain 132 lying below such strand. Each of chains 131 and 132 has a series of outwardly facing bristle engaging prongs 134 thereon so as positively to engage and feed along the bristles 113 transferred thereto from the chain 115.

The chains of device 130 are, in general, driven in timed relationship with the chains 115 and 116 of the first bristle feeding means, but since the prongs 134 positively engage the bristles it is desirable to incorporate a yielding driving means in the drive train thereto from motor 137 so that the bristles are not jammed unduly into the notches in strand 17. The yielding driving means for device 130 is made up of the crank arm 141 depending from the sprocket 140, as shown in Fig. 9, the crank arm driving the generally alternatively acting one-way clutches 145 (top) and 149 (bottom). Connection to clutch 145 is effected through the connecting rod 146, first compression spring 148, and first clutch lever arm 147. Connection to clutch 149 is effected through a second connecting rod 142, a second compression spring 143, and a second clutch arm 144. The clutch arms 144 and 147 are generally oppositely directed. Each of clutches 145 and 149 is of the ratchet toothed type. Clutch 145 is connected to shaft 136 so that arm 147 thereof positively rotates the shaft when the arm is thrust in a clockwise direction by spring 148 (Fig. 9), the arm 147 retreating freely as it is swung in a counterclockwise direction by the return stroke of rod 146. Clutch 149 is so arranged that when its arm 144 is pulled in a clockwise direction by spring 143 it positively drives shaft 136 and that arm 144 retreats freely in a counterclockwise direction as it is swung on its return stroke by rod 142. The left-hand ends of the connecting rods 142 and 146 are headed, the headed end on rod 146 preventing its withdrawal through guide 158; the shanks of the rods slide freely through pivotally mounted guides 153 and 158, respectively, on the outer ends of the arms 144 and 147, so that shaft-driving actuation of the clutches is effected only through the compression springs 143 and 148.

Spring 148 is interposed between guide 158 and an adjustable stop on rod 146. Spring 143 is interposed between the headed end of rod 142 and guide 153. Such compression springs have an effective average operating compression such that they drive shaft 136 with a predetermined desired torque, thus urging the bristles 113 against the notched edge of strand 17 with a predetermined force sufficient to form a well-compacted bristle tuft in each notch. When, for any reason, the resistance to feeding the bristles against strand 17, as by the building up of an undue quantity of bristles at the feeding means 130, and thus the resistance to rotation of the shaft 136, exceed predetermined desired values, the drive from motor 137 to shaft 136 will yield, by the shortening of the clutch-driving springs 143 and 148 at each successive rotation of the shaft 139. This results in a decreased speed of driving of means 130, which decreased speed of driving continues until the excess quantity of bristles has been taken up by the moving notched strand 17. The described second bristle feeding means 130, therefore, insures the presentation of the bristles under adequate pressure to the edge of strand 17, but prevents damage to the bristles or jamming of the machine which might otherwise occur if the bristles were positively fed against the strand.

*The guiding mechanism for notched strand 17 and the bristle tufts entrained therein*

After the bristles 113 have been fed as described against the notched edge of strand 17, the bristle tufts formed in the notches are carried rearwardly of the carriage 35 with the strand 17 as the latter travels toward the brush winding sleeve 37 previously described. In such passage from the bristle feeding device 130 to the winding sleeve 37 the notched strand 17 with bristle tufts engaged in the notches therein passes between the fixed stripper plate 167 and the opposed yieldably mounted guide piece 169, the rear end of which lies upon the horizontal surface 183 of the cut-out zone at the larger diametered end of member 45. The stripper piece 167 has a straight vertically disposed guiding surface, against which the notched edge of strand 17 and the entrained bristle tufts abut. Such surface, as shown in Figs. 6 and 10, lies in the vertical plane containing the notched edge of strand 17 in the zone thereof at which it is first wound upon the brush core 11. The spring pressed guide piece 169 has an upper inclined surface 177, and a lower straight vertically extending surface 176 which engages the opposite unnotched edge of strand 17, as shown in Figs. 5 and 6. As a result of such guiding of the strand 17 and of the bristle tufts entrained in the notches thereof, and by reason of the engagement of the unnotched edge of strand 17 with the vertical guiding surface 183 of block 182 at the winding sleeve 37, such strand and bristle tufts are accurately maintained in the correct path so that successive turns of the strand 17 on the core 11 will have tight edge-to-edge engagement.

Guide piece 169 extends, as indicated in Figs. 1, 2, and 10, forwardly of the carriage sufficiently to back up strand 17 at the zone at which bristles are thrust against the strand by the bristle feeding means 130. Such forward end of guide 169 is, therefore, more strongly pressed to the left (Fig. 2) than is the rear end thereof. In the construction shown, a short, stiff, leaf spring 170, connected to a vertical post 172 rising from the platform of the carriage 35 is connected at its rear end to guide 169 by means of the studs 174. A somewhat longer leaf spring 171 is connected to the rear end of guide 169 by the stud 175. The studs 174 and 175 are preferably adjustable so that guide 167 is normally urged to the left with a predetermined force, and so that the initial orientation of such guide in a horizontal plane may be changed as required.

The engagement between notched strand 17 with the bristle tufts entrained in the notches thereof and the stripper piece 167 and the guide piece 169 imposes a marked retarding tension on the strand as it is wound on the brush core. This insures that the turns of the strand 17, with the entrained bristle tufts, will be accurately and tightly positioned on the brush core.

*The crimping means for strand 19*

The second, crimped wire 19 (designated 19′ in its uncrimped state) is supplied by a reel 188 (Fig. 1) supported on member 74 of the machine bed. Strand 19′, unwound from reel 188 so as initially to lie with its broad surface horizontal, is given a 90° turn about its longitudinal axis in its passage from the reel to the strand guiding means 184 on carriage 35 so that it lies vertical at the guide. From guide means 184 the strand 19′ is led to the crimping means which consists of the two idle, loosely intermeshed, crimping gears 185 and 186. As we have previously seen strand 19 is drawn onto the brush core 11 and wound thereon by the rotation of the core itself. Thus, rotation of the brush core also furnishes the power by which the strand 19′ is drawn from its supply and through the crimping gears 185 and 186 to become the crimped strand 19. Deformation of such strand by the crimping gears, and the driving of the adhesive feeding means by the strand crimping means, in a manner to be described, requires the expenditure of a substantial amount of power. This places the crimped strand 19 under substantial tension, and insures that it is accurately and tightly wound onto the brush core.

From the strand crimping means, strand 19 travels into the curved guiding passage 181 (Fig. 6) in the rear end of guide piece 169. The inner radial surface of passage 181 is so disposed that its rear end lies tangential to the vertical guiding surface 183 at sleeve 45. The upper and lower surfaces of guideway 181 accurately engage the edges of strand 19 and are located to present such strand to the guiding surface 50 of sleeve 45 so that such strand 19 lies directly below and in contact with the unnotched edge of strand 17, as described.

*The adhesive feeding means*

As above noted, as the strands 17 and 19, and the bristle tufts held thereby, are wound onto the brush core 11, there is presented a continuously formed pocket which is closed laterally and radially outwardly but which is open to the edge 53 of the surface 50 of the brush winding sleeve 45. The machine of the invention is provided with means whereby such pocket is continually filled with curable bristle and strand retaining adhesive, such as a heat curable phenol formaldehyde condensation product, so that a strong, durable brush results. It is highly desirable that the correct amount of adhesive be delivered to such pocket since if too large an amount of adhesive is delivered it will leak outwardly from the roots of the bristle tufts before it is cured, and if too small an amount of adhesive is delivered an inferior brush with weakly held bristles will result.

The machine of the invention provides an adhesive dispensing device which delivers the right amount of adhesive to the pocket on the brush core. Such means consists of the adhesive delivering pump 196 which is supplied with adhesive from a tank 199 thereabove through the inlet pipe 197, and which delivers the adhesive under pressure through the pipe 200 to the passage 51 extending through the sleeve 45 to the edge 53 of the step 49 of the helical surface. Pump 196 is driven in timed relationship with the core 11 by means of the shaft 190 driven by the bevel gear 189 from the crimping roll 187, the shaft 190 in turn driving the shaft 195 of the pump through the medium of the one-way clutch 191 and the chain 194 entrained over sprockets on the respective shafts. Since the rate of travel of the strand 19 through the crimping rolls depends directly upon the speed of rotation of the brush core the driving of the adhesive delivering pump 196 at a speed synchronized with the rate of formation of the pocket to be filled with adhesive on the brush core is assured. The one-way clutch 191 allows the shaft 195 positively to be driven by the shaft 190 but allows the pump to be driven manually, if desired, by the handle 192. The pump is manually driven at the beginning of the winding of a brush to insure that pipe 200 in passage 51 will be initially full of adhesive before the brush winding operation is started.

We claim:

1. A machine for making brushes, comprising: a brush core rotating element, means for driving said element, a support mounted closely adjacent the brush core, the brush core and support being mounted for movement relative to each other along a path parallel to the axis of the core, means mounted on the support for feeding a strand toward the core, means on the support positioned along the path of feeding of the strand to the core progressively to deform the strand, means to guide the strand and to lay the strand in its thus deformed state helically onto the core as the core rotates, and means to feed bristles to the edge of the strand as it is fed onto the core.

2. A machine for making brushes, comprising: a brush core rotating element, means for driving said element, a support mounted closely adjacent the brush core, the brush core and support being mounted for movement relative to each other along a path parallel to the axis of the core, means mounted on the support for feeding a strand having a side edge toward the core, for guiding the strand, and for positioning it for winding in a helix on the core by rotation of the core, means on the support positioned along the path of feeding of the strand to the core progressively to notch said side edge of the strand at spaced locations therealong, and means to feed bristles to the notched edge of the strand as it is fed onto the core.

3. A machine for making brushes, comprising: a brush core rotating element, means for driving said element, a support mounted closely adjacent the brush core, the brush core and support being mounted for movement relative to each other along a path parallel to the axis of the core, means mounted on the support for feeding a strand having a side edge toward the core, for guiding the strand, for positioning it for winding in a helix on the core by rotation of the core, and for compacting the helix on the core, driven means on the support positioned along the path of feeding of the strand to the core progressively to notch said side edge of the strand at spaced locations therealong, means interconnecting the brush core rotating element and the strand notching means, and means to feed bristles to the notched edge of the strand as it is fed onto the core.

4. A machine for making brushes, comprising: a brush core rotating element, means for driving said element, a support mounted closely adjacent the brush core, the brush core and support being mounted for movement relative to each other along a path parallel to the axis of the core, means mounted on the support for feeding a strand having a side edge toward the core, for guiding the strand, and for positioning it for winding in a helix on the core by rotation of the core, means positioned along the path of feeding of the strand to the core progressively to notch said side edge of the strand at spaced locations therealong, variable speed means to drive the strand notching means, whereby the spacing between successive notches may be varied, and means to feed bristles to the notched edge of the strand as it is fed onto the core.

5. A machine for making brushes, comprising: a brush core rotating element, means for driving said element, a support mounted closely adjacent the brush core, the brush core and support being mounted for movement relative to each other along a path parallel to the axis of the core, means mounted on the support for feeding a strand having a side edge toward the core, for guiding the strand, for positioning it for winding in a helix on the core by rotation of the core, and for compacting the helix on the core, means on the support positioned along the path of feeding of the strand to the core and acting intermittently to form a single notch on said side edge of the strand in each cycle of the means as the strand travels therepast, variable speed means to drive the strand notching means, and means to feed bristles to the notched edge of the strand as it is fed onto the core.

6. A machine for making brushes, comprising: a brush core rotating element, means for driving said element, a support mounted closely adjacent the brush core, the brush core and support being mounted for movement relative to each other along a path parallel to the axis of the core, means mounted on the support for feeding a strand having a side edge toward the core, for guiding the strand, and for positioning it for winding in a helix on the core by rotation of the core, means positioned along the path of feeding of the strand to the core progressively to notch said side edge of the strand at spaced locations therealong, means including a speed changer interconnecting the brush core rotating element and the strand notching means, whereby the space between successive notches may be varied, and means to feed bristles to the notched edge of the strand as it is fed onto the core.

7. A machine for making brushes, comprising: a brush core rotating element, means for driving said element, a support mounted closely adjacent the brush core, the brush core and support being mounted for movement relative to each other along a path parallel to the axis of the core, means mounted on the support for feeding a strand having a side edge toward the core, for guiding the strand, and for positioning it for winding in a helix on the core by rotation of the core, intermittent cutting means positioned along the path of feeding of the strand to the core progressively to notch said side edge of the strand at spaced locations therealong, means including a speed changer interconnecting the brush core rotating element and the cutting means whereby the space between successive notches may be varied, and means to feed bristles to the notched edge of the strand as it is fed onto the core.

8. A machine for making brushes, comprising: a brush core rotating element, means for driving said element, a support mounted closely adjacent the brush core, the brush core and support being mounted for movement relative to each other along a path parallel to the axis of the core, means mounted on the support for feeding a strand having a side edge toward the core, for guiding the strand, for positioning it for winding in a helix on the core by rotation of the core, and for compacting the helix on the core, means on the support to carry a supply of strip, driven means on the support positioned along the path of feeding of the strip to the core intermittently engaging the strip progressively to notch said side edge of the strip at spaced locations therealong, means including a variable speed changer interconnecting the brush core rotating element and the strip notching means, and means to feed bristles to the notched edge of the strip as it is fed onto the core.

9. A machine for making brushes, comprising: a brush core rotating element, means for driving said element, a support mounted closely adjacent the brush core, the brush core and support being mounted for movement relative to each other along a path parallel to the axis of the core, means mounted on the support for feeding a strand having a side edge toward the core, for guiding the strand, and for positioning it for winding in a helix on the core by rotation of the core, a rotary shear positioned along the path of feeding of the strand to the core progressively to form in each cycle said single notch on a side edge of the strand, means including a speed changer variable in infinite steps interconnecting the brush core rotating element and the shear, and means to feed bristles to the notched edge of the strand as it is fed onto the core.

10. A machine for making brushes, comprising: a brush core rotating element, means for driving said element, a support mounted closely adjacent the brush core, the brush core and support being mounted for movement relative to each other along a path parallel to the axis of the core, means mounted on the support for feeding a strand having a side edge toward the core, for guiding the strand, and for positioning it for winding in a helix on the core by rotation of the core, a shear having single notch-forming dies positioned along the path of feeding of the strand to the core progressively to notch said side edge of the strand at spaced locations therealong, means including a speed changer variable in infinite steps interconnecting the brush core rotating element and the shear whereby the space between successive notches may be varied in infinite increments, and means to feed bristles to the notched edge of the strand as it is fed onto the core.

11. A machine for making brushes, comprising: a brush core rotating element, means for driving said element, a support mounted closely adjacent the brush core, the brush core and support being mounted for movement relative to each other along a path parallel to the axis of the core, means mounted on the support for feeding a strand having a side edge toward the core, for guiding the strand, and for positioning it for winding in a substantially closed helix on the core by rotation of the core, means on the support to carry a supply of metal strip, a rotary shear on the support having single notch-forming dies positioned along the path of feeding of the strip to the core intermittently engaging the strip progressively to notch said side edge of the strip at spaced locations therealong, means including a speed changer variable in infinite steps interconnecting the brush core rotating element and the shear whereby the space between successive notches may be varied in infinite increments, and means to feed bristles to the notched edge of the strip as it is fed onto the core.

12. A machine for making brushes, comprising: a brush core rotating element, means for driving said element, a support mounted closely adjacent the brush core, the brush core and support being mounted for movement relative to each other along a path parallel to the axis of the core, means mounted on the support for feeding a strand toward the core, for guiding the strand, and for positioning it for winding in a helix on the core by rotation of the core, strand crimping means positioned along the path of feeding of the strand to the core, and means to feed bristles between the last complete turn of the coil of the strand on the core and the portion of the strand at its first engagement with the core.

13. A machine for making brushes, comprising: a brush core rotating element, means for driving said element, a support mounted closely adjacent the brush core, the brush core and support being mounted for movement relative to each other along a path parallel to the axis of the core, means mounted on the support for feeding a strand toward the core for guiding the strand, and for positioning it for winding in a helix on the core by rotation of the core, strand crimping means driven by the travel of the strand therepast and positioned along the path of feeding of the strand to the core, and means to feed bristles between the last complete turn of the coil of the strand on the core and the portion of the strand at its first engagement with the core.

14. A machine for making brushes, comprising: a brush core rotating element, means for driving said element, a support mounted closely adjacent the brush core, the brush core and support being mounted for movement relative to each other along a path parallel to the axis of the core, means mounted on the support for feeding a strand toward the core, for guiding the strand, and for positioning it for winding in a helix on the core by rotation of the core, strand crimping means mounted on the support and positioned along the path of feeding of the strand to the core, means to feed bristles between the last complete turn of the coil of the strand on the core and the portion of the strand at its first engagement with the core, an adhesive dispensing means including a pump for delivering adhesive to the roots of the bristles as they are deposited on the core, and means for driving the crimping means and the pump in timed relationship to each other.

15. A machine for making brushes, comprising: a brush core rotating element, means for driving said element, a support mounted closely adjacent the brush core, the brush core and support being mounted for movement relative to each other along a path parallel to the axis of the core, means mounted on the support for feeding a strip toward the core, for guiding the strand and for positioning it for winding it edgewise in a helix on the core by rotation of the core, means for corrugating the broad surfaces of the strip transversely to the length of the strip driven by the travel of the strip therepast and positioned along the path of feeding of the strip to the core, and means to feed bristles between the last complete turn of the coil of the strip on the core and the portion of the strip at its first engagement with the core.

16. A machine for making brushes, comprising: a brush core rotating element, means for driving said element, a support mounted closely adjacent the brush core, the brush core and support being mounted for movement relative to each other along a path parallel to the axis of the core, means mounted on the support for feeding a strand toward the core, for guiding the strand, and for positioning it for winding in a helix on the core by rotation of the core, strand crimping means mounted on the support and driven by the travel of the strand therepast and positioned along the path of feeding of the strand to the core, means to feed bristles between the last complete turn of the coil of the strand on the core and the portion of the strand at its first engagement with the core, an adhesive dispensing means including a pump for delivering adhesive to the roots of the bristles as they are deposited on the core, and pump driving means interconnecting the crimping means and the pump.

17. A machine for making brushes, comprising: a brush core rotating element, means for driving said element, a support mounted closely adjacent the brush core, the brush core and support being mounted for movement relative to each other along a path parallel to the axis of the core, means mounted on the support for feeding a strip toward the core, for guiding the strip and for positioning it for winding in a helix on the core by rotation of the core, rotary strip crimping means comprising opposed gear-like members driven by the travel of the strip therethrough and positioned on the support and along the path of feeding of the strip to the core, means to feed bristles between the last complete turn of the coil of the strand on the core and the portion of the strand at its first engagement with the core, an adhesive dispensing means including a pump for delivering adhesive to the roots of the bristles as they are deposited on the core, and pump driving means interconnecting the crimping means and the pump.

18. A machine for making brushes, comprising: a brush core rotating element, means for driving said element, a support mounted closely adjacent the brush core, the brush core and support being mounted for movement relative to each other along a path parallel to the axis of the core, means mounted on the support for feeding a strand having a side edge toward the core, for guiding the first strand and for positioning it for winding in a substantially closed helix on the core by rotation of the core, driven means on the support positioned along the path of feeding of the first strand to the core intermittently engaging the strand progressively to notch said side edge of the strand at spaced locations therealong, means including a speed changer interconnecting the brush core rotating element and the strand notching means, means mounted on the support for feeding a second strand toward the core, for guiding the second strand, and for positioning it for winding it edgewise in a helix on the core beneath the first strand by rotation of the core, crimping means for the second strand driven by the travel of the second strand therepast and positioned on the support and along the path of feeding of the second strand to the core, and means to feed bristles between the last complete turn of the coils of the two strands on the core and the portion of the strands at their first engagement with the core.

19. A machine for making brushes, comprising: a brush core rotating element, means for driving said element, a support mounted closely adjacent the brush core, the brush core and support being mounted for movement relative to each other along a path parallel to the axis of the core, means mounted on the support for feeding a first strand having a side edge toward the core, for guiding the first strand, and for positioning it for winding in a substantially closed helix on the core by rotation of the core, driven means on the support positioned along the path of feeding of the first strand to the core intermittently engaging the strand progressively to notch said side edge of the strand at spaced locations therealong, means including a speed changer variable in infinite steps interconnecting the brush core rotating element and the strand notching means, means mounted on the support for feeding a second strand toward the core, for guiding the second strand, and for positioning it for winding in a helix on the core and beneath the first strand by rotation of the core, rotary means for crimping the second strand driven by the travel of the second strand therepast and positioned on the support and along the path of feeding of the second strand to the core, means to feed bristles between the last complete turn of the coils of the strands on the core and the portion of the strands at their first engagement with the core, an adhesive dispensing means including a pump for delivering adhesive to the roots of the bristles as they are deposited on the core, and pump driving means interconnecting the crimping means and the pump.

20. In a machine for making brushes by winding an edge-notched strand having bristle tufts entrained in the notches on the strand onto a core, the improved bristle and strand feeding mechanism which comprises driven means for feeding the notched strand in a path toward the brush core, means forming a channel to guide a row of bristles against the notched edge of the strand, bristle engaging and forwarding means to feed bristles along the channel toward the strand, and yieldable means drivingly interconnecting the last named means with the means for feeding the notched strand.

21. In a machine for making brushes by winding an edge-notched strand having bristle tufts entrained in the notches on the strand onto a core, the improved bristle and strand feeding mechanism which comprises driven means for feeding the notched strand in a path toward the brush core, means forming a channel to guide a row of bristles against the notched edge of the strand, bristle engaging and forwarding means disposed along at least one side of the channel to feed bristles along the channel toward the strand, and yieldable means drivingly interconnecting the last named means with the means for feeding the notched strand so as to forward the bristles generally in timed relation with the travel of the notched strand.

22. In a machine for making brushes by winding an edge-notched strand having bristle tufts entrained in the notches on the strand onto a rotating core, the improved bristle and strand feeding mechanism which comprises driven means for feeding the notched strand in a path toward the brush core, means forming a channel directed toward the notched edge of the strand to guide tufts of bristles into the notches on the strand, a driven elongated endless bristle engaging and forwarding conveyor disposed along at least one side of the channel above and below the strand, the rear end of said conveyor extending past the notched strand, and means driving the bristle engaging and forwarding means.

23. In a machine for making brushes by winding an edge-notched strand having bristle tufts entrained in the notches on the strand onto a rotating core, the improvement which comprises driven means for feeding the notched strand in a path toward the brush core, means forming a channel directed toward the notched edge of the strand to guide tufts of bristles into the notches on the strand, a driven elongated endless bristle engaging and forwarding conveyor disposed along at least one side of the channel, and means drivingly connecting the means for feeding the notched strand and the bristle engaging and forwarding means, said last named means including a yieldable driving connection whereby the strand feeding means may over-run the bristle conveyor.

24. In a machine for making brushes by winding an edge-notched strand having bristle tufts entrained in the notches on the strand onto a rotating core, the improvement which comprises driven means for feeding the notched strand in a path toward the brush core, means forming a channel directed toward the notched edge of the strand to guide tufts of bristles into the notches on the strand, driven bristle engaging and forwarding means disposed along at least one side of the channel, and yieldable driving means comprising generally alternately acting one-way clutches having yieldable driving arms connecting the means for feeding the notched strand and the bristle engaging and forwarding means.

References Cited in the file of this patent
UNITED STATES PATENTS
1,950,379   Angell _____ Mar. 13, 1934